March 26, 1963  E. DI FRANCESCO  3,082,972
WASHING AND DRYING APPARATUS FOR FISHING LINES
Filed Sept. 29, 1960
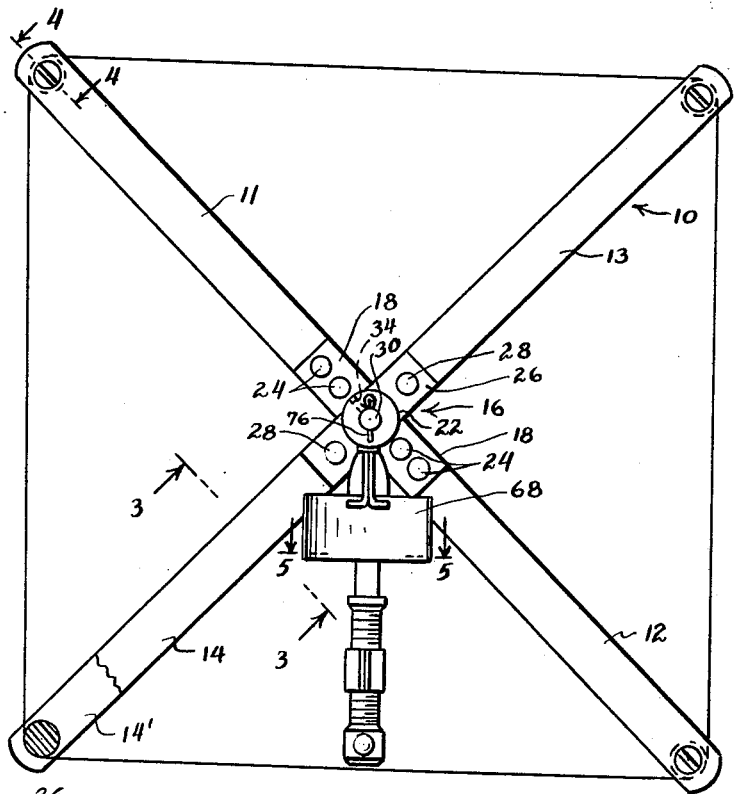
INVENTOR.
Emilio Di Francesco
BY Emery, Whittemore,
Sandoe & Graham
ATTORNEYS United States Patent Office 3,082,972
Patented Mar. 26, 1963

3,082,972
WASHING AND DRYING APPARATUS FOR FISHING LINES
Emilio Di Francesco, Box 176, Sparkill, N.Y.
Filed Sept. 29, 1960, Ser. No. 59,394
3 Claims. (Cl. 242—104)

This invention relates to apparatus for washing and drying fishing lines.

It is an object of the invention to provide an improved apparatus of the reel type for washing and drying fishing lines. The invention includes two frames with radially-extending spokes and with cross bars near the outer ends of the spokes. Unlike the usual reel, these cross bars are spaced as far as practical from the center of the reel so as to increase the length of fishing line that can be wrapped on the reel with each turn, and to provide a large space for the circulation of air through the turns of line that are wrapped on the reel.

Another object of the invention is to provide a washing and drying reel which can be knocked down for compact storage, and which can be assembled easily with no tools other than a screwdriver.

Still another object of the invention is to provide washing and drying apparatus for fishing lines with provision for detachably clamping the apparatus quickly and conveniently to a table, shelf, or similar support. The construction is such that the reel is supported on a cantilever axle with which the reel rotates in space located in front of the shelf or other support.

Other objects, features and advantages of the invention will appear or be pointed out as the description proceeds.

In the drawing, forming a part hereof, in which like reference characters indicate corresponding parts in all the views;

FIGURE 1 is a rear elevation, partly broken away and in section, of a washing and drying apparatus made in accordance with this invention;

FIGURE 2 is a side elevation of the washing and drying apparatus illustrated in FIGURE 1, and showing the way in which the apparatus is clamped to a table top or shelf; and FIGURES 3–5 are sectional views taken on the lines 3—3, 4—4 and 5—5, respectively, of FIGURE 1.

The apparatus shown in FIGURE 1 includes a reel 10 having two end frames or spiders. One of the end frames includes radially-extending spokes 11, 12, 13 and 14 located at equal angular spacing around a hub portion 16. The other frame includes similar spokes indicated by the same reference characters with a prime appended.

The spokes 11 and 12 are in line with one another and are connected together. They are preferably of one-piece construction. The spokes 13 and 14 are also in line with one another and preferably of one-piece construction. The spokes 13 and 14 extend across the outside surface of the spokes 11 and 12 at the hub portion of the reel. There are blocks 18 attached to the outside faces of the spokes 11 and 12 on opposite sides of the spokes 13 and 14 so as to form a channel 22 into which the spokes 13 and 14 extend.

The channel 22 is of a width equal to the width of the spokes 13 and 14 so as to prevent any angular movement of the spokes 13 and 14 with respect to the spokes 11 and 12. The blocks 18 are secured to the spokes 11 and 12 in any suitable manner; and in the construction illustrated there are rivets 24 connecting the blocks 18 to the spokes 11 and 12.

A block 26 is attached to the spokes 13 and 14 by rivets 28 and this block 26 is a part of the hub portion 16 of the reel. An axle 30 extends through aligned openings 32 in the block 26 and the portions of the spokes where they join one another. The axle 30 fits through the aligned openings 32 with a running fit, and it can be made with a looser fit if wider manufacturing tolerances are desired. A set screw 34 threads through the block 26 and secures the block to the axle 30 so that the block 26 and the axle rotate as a unit.

Since the spokes 13 and 14 are secured to the block 26 by rivets 28, they also rotate as a unit with the axle. The rotation of the spokes 13 and 14 imparts similar rotation to the spokes 11 and 12 by contact of the spokes 13 and 14 with the blocks 18 that are riveted to the spokes 11 and 12, as already described.

The frame on the other side of the reel 10, comprising the spokes 11', 12', 13' and 14', is of similar construction to that already described, and it has corresponding blocks and rivets indicated by the same reference characters but with a prime appended for all parts of the left-hand frame in FIGURE 2 of the drawing. The block 26' is secured to the axle 30 by a set screw in the same way as the block 26 of the right-hand frame.

The outer portions of the spokes are connected together by cross bars 36. These cross bars are preferably cylindrical, and they are attached at their opposite ends to the spokes of the reel by screws 38, as shown in FIGURE 4. The screw 38, shown in FIGURE 4, extends through an opening in the spoke 11 and threads into a bore 42 in the end of the cross bar 36. All of the other connections between the cross bars and the spokes are of similar construction. It is a feature of the invention that the end faces of the cross bars 36 clamp tightly against the inside face of the adjacent spoke so as to prevent the fishing lines from being displaced axially off the end of the cross bar 36. Because of the small diameter of fishing lines, even a small clearance between the end face of the cross bar 36 and the spoke 11 (FIGURE 4), would permit the fishing line to catch in the clearance with possible damage to the line when unreeling.

There is a gripper 43 consisting of a small leaf spring secured to one of the cross bars 36 for holding the end of the line. The line is pulled tightly into the decreasing clearance between the gripper and the cross bar before starting the winding of the line.

Because of the construction in which the spokes 13, 14, and 13' and 14' extend across the outside faces of the spokes 11, 12 and 11', 12', respectively, it will be apparent that the bars 36 between some of the spokes are of different lengths than between others. For example, the bar 36 which extends between the spokes 13 and 13' is longer than the bar 36 which extends between the spokes 11 and 11' by a distance equal to the combined thicknesses of the spokes 11 and 11'.

In the construction illustrated, there is a sleeve 46 on the axle 30 between the hub portions of the opposite reels. This sleeve 46 contacts with the frames at opposite sides of the reel to hold the frames equally spaced from one another and it adds some strength and rigidity to the apparatus, though the frames can not move toward one another, when assembled with the axle, because of the set screws 34 and 34'.

The axle 30 extends into a bearing sleeve 50 which is attached to the upper end of a clamp 52. This clamp has a frame 54 to which the sleeve 50 is permanently secured by welding 56. The clamp 52 has a fixed upper jaw 58 and a movable lower jaw 60 located at the upper end of a screw 62. The screw 62 threads through the lower portion of the clamping frame 54 and has a handle 64 at its lower end. This is a usual C-clamp construction. Other types of clamps can be used, if desired.

FIGURE 2 shows a table top or shelf 66 in dotted lines, and shows the clamp 52 in operative position along the edge of this shelf 66.

In order to prevent twisting of the clamp 52, a face plate 68 is welded to the inside of the clamp frame in position to bear against the edge of the table top or shelf 66. This face plate 68 is preferably made with a concave surface confronting the edge of the table top or shelf 66 so that the opposite ends of the plate 68 bear against the edge of the table top or shelf 66 and provide leverage for preventing the clamp from twisting. This is important because of the cantilever support of the axle 30 and the resulting leverage tending to twist the clamp 52 when the apparatus is being used to wind a fishing line onto the reel 10.

The axle 30 is rotated by a crank 70 formed on one end of the axle 30. A separate crank can be attached to the axle, but in the preferred construction, the crank 70 is one piece with the rest of the axle 30, this providing a more economical construction. The axle 30 is held against axial movement with respect to the bearing sleeve 50 by thrust bearings at opposite ends of the bearing sleeve. The block 26 abuts against the end face of the sleeve 50 and serves as a thrust bearing for preventing displacement of the axle 30 and reel 10 toward the right in FIGURE 2. A washer 74 fits over the axle 30 at the other end of the sleeve 50 and is held on the axle by a cotter pin 76. This washer 74 provides a thrust bearing for preventing the axle 30 and reel 10 from moving axially toward the left with respect to the sleeve 50.

In considering the broader aspects of the invention, the washer 74 and cotter pin 76 are merely representative of detachable thrust bearings for preventing displacement of the axle in the sleeve 50. It will be apparent that the removal of the washer 74 and cotter pin 76 permits the axle to be withdrawn from the bearing sleeve 50, and also from the reel 10. This also disassembles the reel 10 from the bearing sleeve 50 and the clamp 52. Removal of the axle 30 permits the sleeve 46 to be removed from the reel; and the reel can be collapsed into a compact space by removing the screws 38 and cross bars 36. The screws 38 are, therefore, representative of detachable fastening means securing the cross bars 36 to the end frames of the reel.

The apparatus is preferably made of a non-ferrous metal, such as aluminum, and some parts can be made of stainless steel, as for example, the bearing sleeve 50. The apparatus can also be made with parts of plastic or other materials and the shapes of the different parts can be modified as desired. For more economical construction, some parts can be made as stampings. Various other changes and modifications can be made without departing from the invention as described in the claims.

What is claimed is:

1. In washing and drying apparatus for fishing lines including reels that have a pair of inner spoke structures which are spaced from one another across the reel, and a pair of outer spoke structures which are spaced from one another across the reel and each of which has a face that confronts and is adjacent to a face of one of the inner spoke structures, each of the outer spoke structures extending transversely across one of the inner spoke structures at the mid regions of the adjacent spoke structures, the improvement which comprises positive blocking means for holding the spoke structures in their fixed transverse angular relationship to one another including shoulders extending from a surface of each spoke structure of one pair immediately adjacent to a corresponding spoke structure of the other pair, the shoulders having straight surfaces that form, with the surface from which they extend, a channel that blocks angular movement of the spoke structure with respect to one another, axially extending spacer means adjacent to the outer ends of the spoke structures and on which the fishing line wraps and spoke structures on one side of the reel spaced from those on the other side, and other spacer means at the middle of the reel for holding the spoke structures of the inner pair against axial displacement toward one another whereby the spoke structures of one pair are held in the channels formed by the shoulders extending from the spoke structures of the other pair.

2. The washing and drying apparatus for fishing lines described in claim 1 and characterized by each of the spoke structures being a continuous, one-piece, straight and flat bar, blocks secured to each of the flat bars on a wide side thereof and at spaced locations along the length of the spoke structures with generally parallel confronting ends of the blocks constituting the shoulders that form, with the surfaces from which they extend, the channel for receiving a spoke structure from the other pair.

3. The washing and drying apparatus described in claim 1 characterized by aligned openings through all of the spoke structures for receiving an axle, the other spacer means being a sleeve through which the axle extends, the opposite ends of the sleeve abutting against the spoke structure of the inner pair, a bearing beyond one side of the reel and through which the axle extends, and a clamp to which said bearing is connected and from which the axle extends as a cantilever axle.

References Cited in the file of this patent

UNITED STATES PATENTS

| | | |
|---|---|---|
| 506,138 | Souder | Oct. 3, 1893 |
| 867,959 | Erison et al. | Oct. 15, 1907 |
| 1,192,441 | Lydecker | July 25, 1916 |
| 1,793,980 | Weinstein | Feb. 24, 1931 |
| 2,040,567 | Rowe | May 12, 1936 |
| 2,041,249 | Johnson | May 19, 1936 |
| 2,041,384 | Tueckmantel | May 19, 1936 |
| 2,057,728 | Lester | Oct. 20, 1936 |
| 2,627,378 | Hirsh | Feb. 3, 1953 |
| 2,879,009 | Douglass | Mar. 24, 1959 |